United States Patent
Otenio et al.

[19]

[11] Patent Number: 5,969,891
[45] Date of Patent: Oct. 19, 1999

[54] MULTI-USE ARTICULATION FOR EXTERNAL SIDE VIEW MIRRORS

[75] Inventors: Dejail Otenio, Sao Bernardo Do Campo; Roberto Cermak, Santo Andre, both of Brazil

[73] Assignee: Metagal Industria E Comercio Ltda., Sao Paulo, Brazil

[21] Appl. No.: 09/120,998

[22] Filed: Jul. 23, 1998

[30] Foreign Application Priority Data

Jul. 28, 1997 [BR] Brazil ............................... PI 97 02665

[51] Int. Cl.[6] ...................................................... G02B 7/182
[52] U.S. Cl. ........................ 359/871; 359/872; 359/874; 359/876; 248/474; 248/476; 248/477
[58] Field of Search ..................................... 359/871, 872, 359/874, 876; 248/474, 476, 477, 479, 485, 481, 483, 496

[56] References Cited

U.S. PATENT DOCUMENTS 2,146,859 2/1939 Seklehner ................................. 359/871
5,838,507 11/1998 Boddy et al. ............................ 359/877
5,851,064 12/1998 Lyons ....................................... 362/494

*Primary Examiner*—Cassandra Spyrou
*Assistant Examiner*—Mohammad Y. Sikder
*Attorney, Agent, or Firm*—Michael J. Striker

[57] ABSTRACT

The multi-use articulation includes a stationary articulation section (10), mounted on the internal face of the rear wall of the housing (2), a moveable articulation section (20) on which the mirror plate (1) is mounted and a U-shaped connecting element (30) for torque adjustment and vibration absorption connecting both sections. The U-shaped connecting element (30) of the articulation sections has respective outwardly extending end portions (31) connected to a pair of opposite hook-shaped projections (23) of the moveable articulation section (20) so that the hook-shaped projections (23) and/or end portions (31) of the U-shaped element (30) can provide an axially tighter or looser assembly. The foregoing U-shaped connecting element (30) consists of an arc-shaped intermediary arched portion (32) which is tightly and freely retained to slide on a curved guide surface (12), both of which are designed to provide greater resistance to motion of the moveable articulation section (20) and mirror plate (1) around the geometric x-axis arranged transversely to the connecting element (30) than around the geometric y-axis.

8 Claims, 4 Drawing Sheets

MULTI-USE ARTICULATION FOR EXTERNAL SIDE VIEW MIRRORS

BACKGROUND OF THE INVENTION

The present invention relates to an articulation, used in the field of automobile accessories, more precisely for external side view mirrors, which was developed for many applications in order to fulfill the industry's different needs, and to simplify the production process, improve performance, utilization and to lower production costs.

External side view mirrors are already known comprising an actual mirror plate; an articulation, which is a movable part seated on a rear face of the mirror plate; a housing accommodating the mirror plate and having a rear internal wall on which a stationary section of the articulation is seated and a base on which the housing is mounted and which is attached to the vehicle body.

One type of side view mirror can be manually adjusted by turning or positioning the mirror plate directly by hand by the vehicle's driver (manual adjustment) to place it in the desired position.

The other possibility is to produce a mirror in which the adjusting is accomplished by remote control by cables. This type of mirror arrangement has at least three cables and an operating lever inside the vehicle. One of the cable ends is attached to an appropriate moveable section of the articulation and another of the ends is attached to the operating lever mounted on the inside face of the vehicle's door so that when this operating lever is properly moved, its motion is then transmitted by the cables to the moveable part of the articulation which moves in relation to a fixed section of the articulation, thus moving the mirror plate attached to the aforesaid moveable part of the articulation around x- and y-axes.

These two articulation structures are required to satisfy somewhat different needs. The manual adjustment solution requires an articulation that is more rigid, that is, it requires a greater torque to move it. The remote control solution requires that the articulation be more loose, that is, it requires less torque to be moved.

This complicates the manufacturing process, since specific tools are needed for either one or the other solution, which is undesirable, either from a technical or economical point of view.

The other disadvantages of these external side view mirrors of the above-described type include the fact that, when in use, it is not unusual that the mirror plate itself vibrates, which, besides impairing the user's view, also helps to change the set position of the mirror which results in further difficulties for the user. Such vibrations are generally due, among others, to the geometry of the mirror, the level of vibrations generated by the operation of the vehicle, the unevenness of the roads and other factors.

Usually, in order to solve this problem, studies are conducted to detect the intensity and the direction of the vibration and the mirrors are equipped with anti-vibration devices, which in one production process have the shape of pins that project from the inside face of the forward housing wall, which are appropriately deployed so that their free tips support the mirror plate.

Nevertheless, this type of solution complicates the manufacturing process which is undesirable.

SUMMARY OF THE INVENTION

Therefore, an object of the present invention is to provide a multi-use articulation that provides the possibility of making either a manual adjustment type or a remote control adjustment type of external side view mirror.

Another object of the present articulation is to provide an articulation that simultaneously acts as an anti-vibration device.

An additional object of the invention is to provide a multi-use articulation for an external side view mirror that is of a simple construction and that is manufactured by an equally simple process with the prospect of adequately fulfilling both the technical and economic requirements.

Taking into consideration the above-described problems with the intention to overcome them and to fulfill the aforementioned objectives, the multi-use articulation according to the invention for external side view mirrors was developed, and essentially comprises a stationary articulation section, substantially in the shape of a hub cap with a spherical section configuration, a moveable articulation section which fits tightly and slides in the outer stationary articulation section and a U-shaped connecting element for connection of both articulation sections, for adjustment of the torque and vibration absorption. The stationary articulation section is seated with its smaller base region on the interior face of a housing wall. The moveable articulation section has an outer portion of equal shape as the stationary articulation section from which projects an interior truncated conical portion, on which the forward face of the mirror plate sits. The U-shaped connecting element has outwardly turned ends connected to a pair of hook-shaped projections protruding from the base portion of the interior truncated conical portion of the moveable articulation section, so that the aforesaid hook-shaped projections and/or end portions of the U-shaped connecting element provide the means for a tighter axial assembly adequate for manual adjustment or the means for a looser axial assembly adequate for remote control. An intermediate arch portion of the aforesaid connecting element is retained tightly and free to slide on a curved guide surface of the stationary articulation section, this middle portion being designed to provide a greater force for motion of the mirror plate around the geometric x-axis transversely oriented in relation to the connecting element than that force required to move it around the y-axis oriented in the same direction as the connection element.

Therefore, an articulation constructed in this form solves the problems and also fulfills the aforementioned objects, since it allows a similar set of parts, and therefore the same tools, to provide an assembly that includes either the manually adjustable type mechanism or the remote control mechanism. The connecting element is assembled with the stationary and moveable sections of the articulation in order to fulfill either one of the solutions as may be desired.

On the other hand, the connecting element of the stationary and moveable articulation sections, since it requires a greater effort to move the latter and thus the mirror plate around the x-axis than what is necessary to move them around the y-axis, as mentioned above, allows the articulation to be assembled in such a way that the aforementioned connecting element remains transverse in relation to the geometric axis around which the mirror plate would eventually vibrate, or, in other words, that the geometric x-axis coincides with the geometric axis around which the mirror vibrates. Therefore, in this manner the articulation besides its normal function, also acts as a vibration attenuator.

BRIEF DESCRIPTION OF THE DRAWINGS

The objects, features and advantages of the invention will now be illustrated in more detail with the aid of the following detailed description with reference to the attached drawings in which.

DESCRIPTION OF THE PREFERRED EMBODIMENTS

Figure 1:
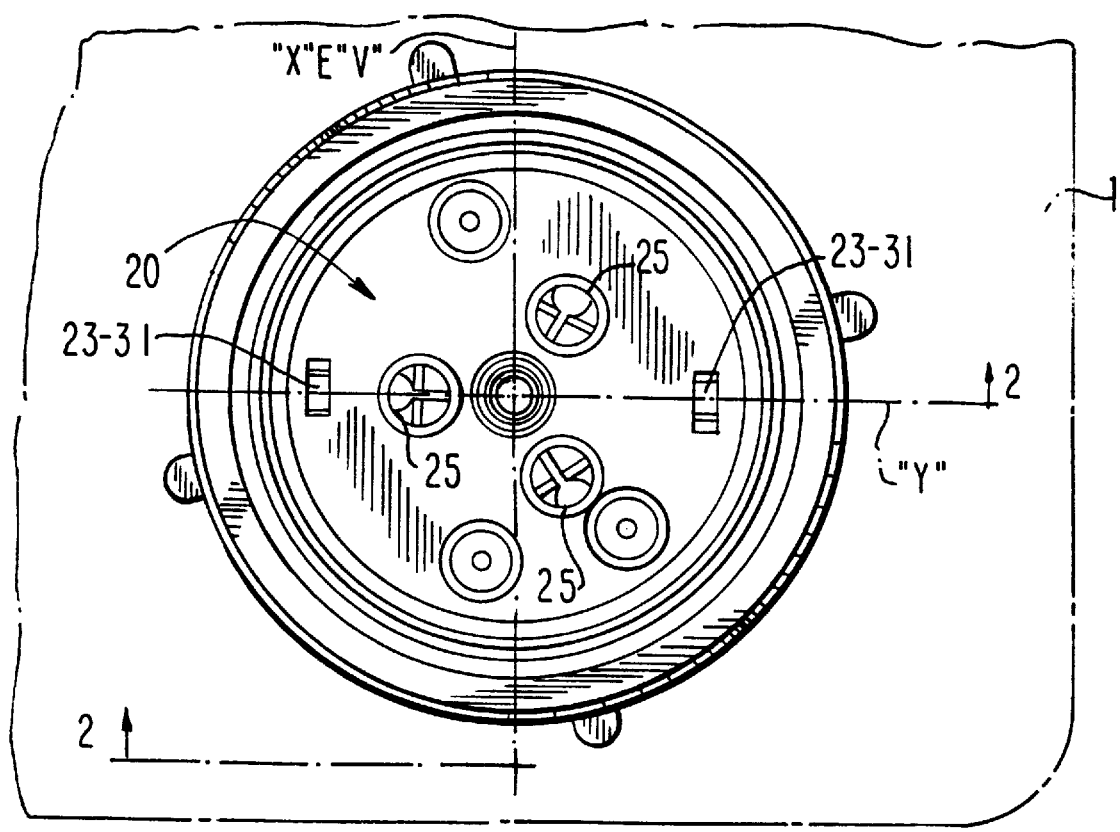
FIG. 1 is a plan view of a multi-use articulation according to the invention from the side that receives the rear face of the mirror plate.
Figure 2:
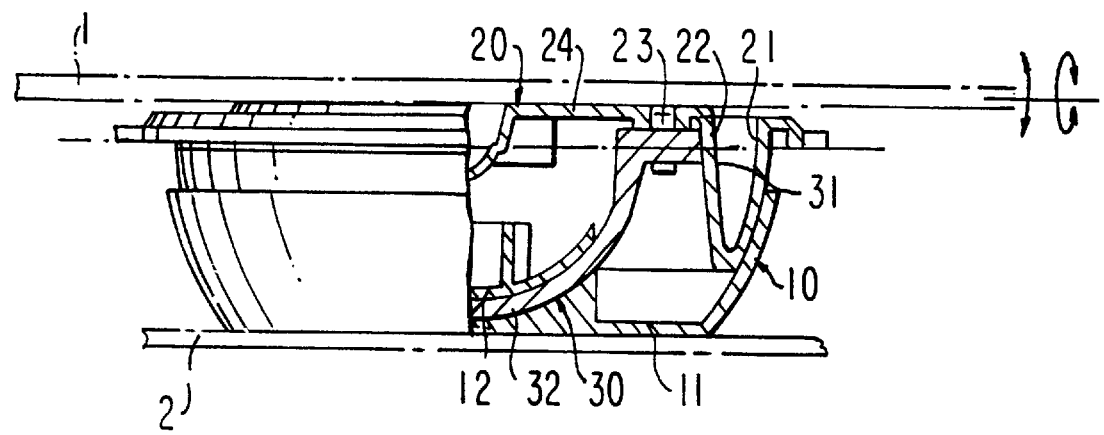
FIG. 2 is a partially side view, partially cross-sectional view through the articulation shown in FIG. 1 taken along the section line I—I indicated in FIG. 1 in the direction of the arrows.
Figure 3A:
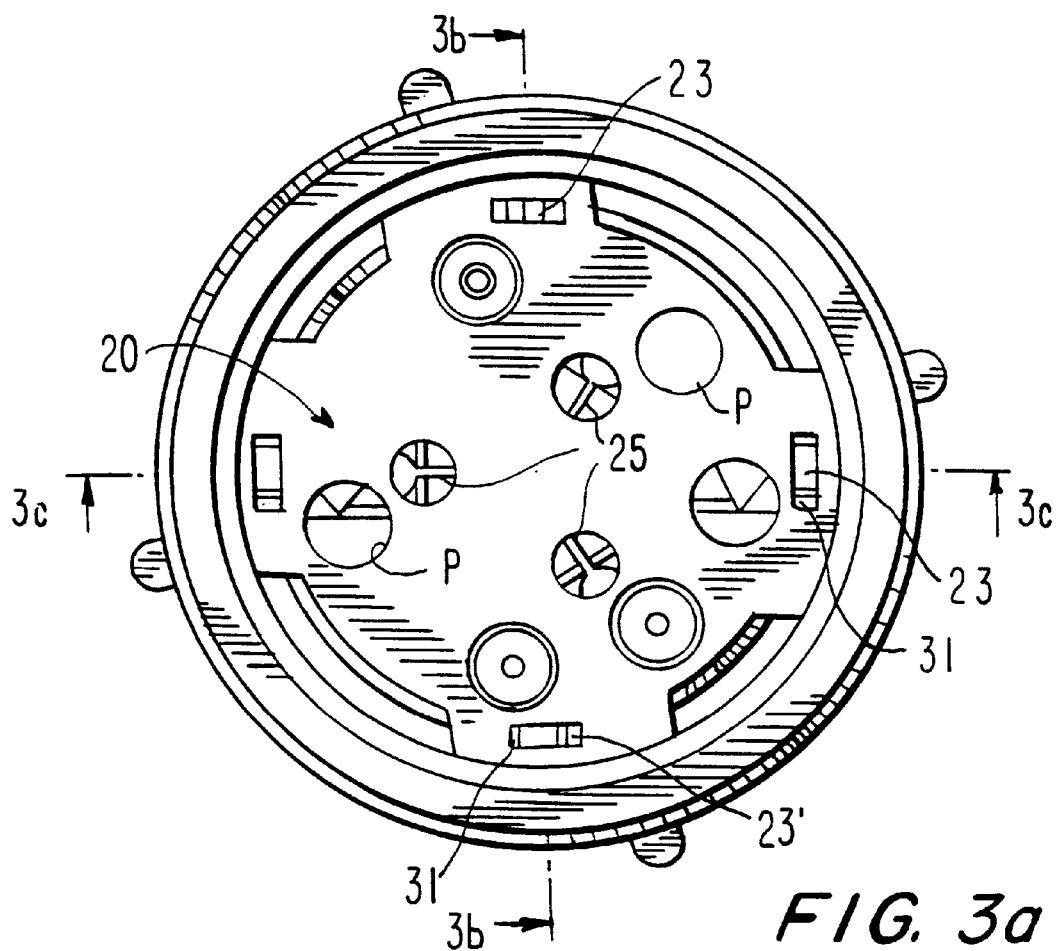
FIGS. 3a to 3d are respectively a plan view, two vertical cross-sectional views taken along section lines II—II and III—III in FIG. 3a and a perspective view of another embodiment of the multi-use articulation according to the invention from the side that receives the rear face of the mirror plate.
Figure 3B:
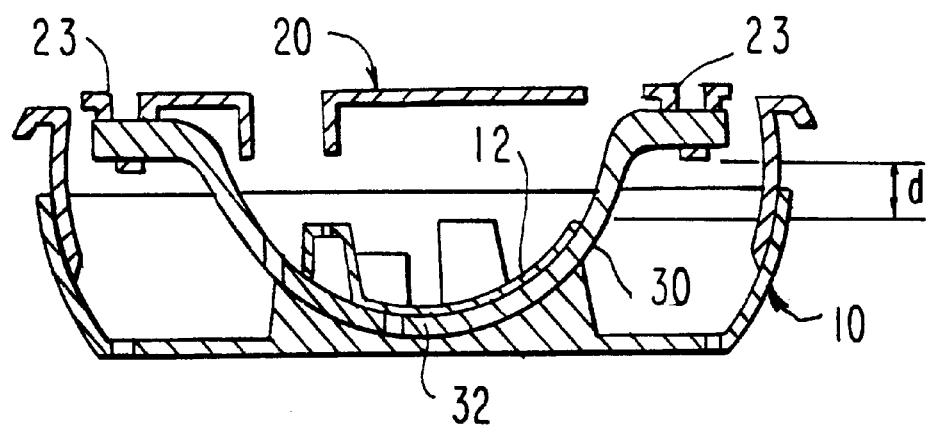
Figure 3C:
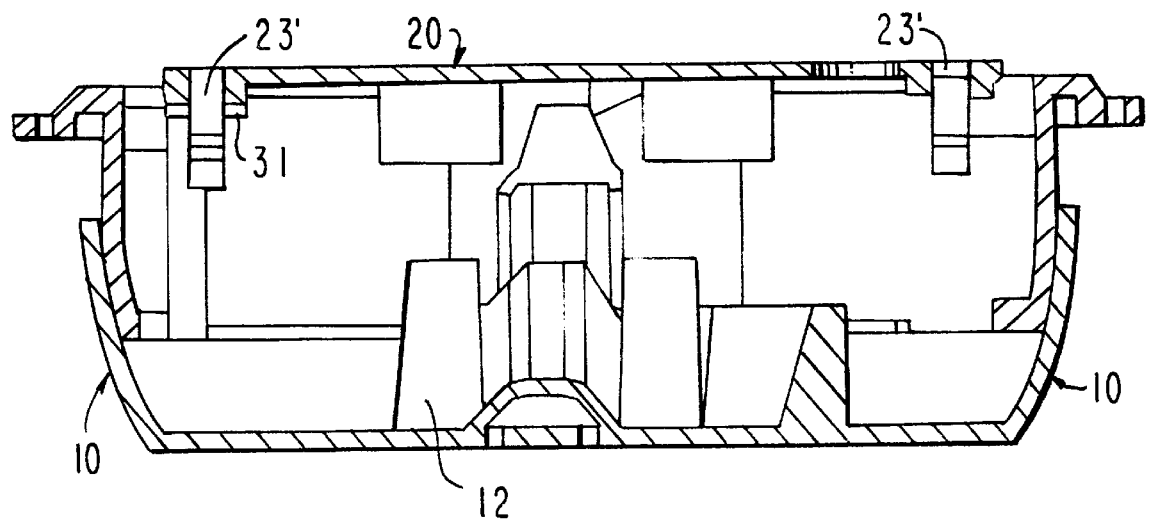
Figure 3D:
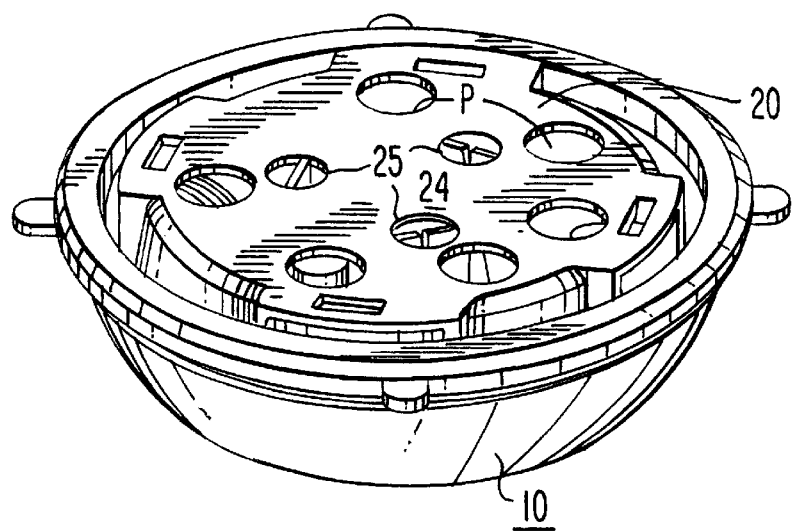

The figures show an external side view mirror substantially comprised by a mirror plate 1, an articulation according to the invention, a housing 2 (FIG. 2) that accommodates the mirror plate and the articulation and a base (not shown) on which the housing is mounted and which is then attached to the vehicle. The side view mirror is of the type in which the position of the mirror plate 1 is set manually by direct action on the manually set position of the mirror plate or by a lever and cable remote control positioning mechanism inside the vehicle.

Thus, in its essence, the aforementioned articulation comprises a stationary articulation section 10, substantially in the shape of a hub cap with a spherical section configuration, a moveable articulation section 20 which fits tightly and slides within the outer stationary articulation section 10 and a U-shaped connecting element 30 for connection of both articulation sections, for adjustment of the torque and vibration absorption. The stationary articulation section 10 has a smaller base region 11 resting on the inside face of the housing wall 2. The moveable articulation section 20 has an outer portion 21 of identical shape as a matching portion of the first articulation section 10, which fits tightly and slides within it, and an internal truncated conical portion 22 concentric to the aforementioned outer portion 21, on which is seated the rear face of the mirror plate 1. The U-shaped connecting element 30 is provided with outwardly turned or bent end portions 31 that are connected to a pair of opposing hook-shaped projections 23 protruding from a base portion 24 of the internal truncated conical portion 22 of the moveable articulation section 20, so that the hook projections 23 and/or end portions 31 of the U-shaped connecting element 30 provide the flexibility or means for either an axially tighter assembly adequate for the manual adjustment type mechanism or a loose axial assembly adequate for the remote control type mechanism. The aforementioned U-shaped connecting element 30 includes an intermediate arched portion 32, which is retained tightly and free to slide on a curved guide surface 12 selected to provide a greater amount of force required to move the moveable section 20 and consequently the mirror plate 1 assembled on it around the geometric x-axis transverse to the connecting element 30 and thus in relation to the aforementioned intermediate arched portion 32 and to provide a smaller amount of force required to move the moveable articulation section 20 and the mirror plate around the geometric y-axis, which extends in the same direction of the connecting element 30.

The articulation is also an anti-vibration device for the mirror plate 1. Because of that, its U-shaped connecting element for the stationary articulation section 10 and the moveable articulation section 20 and the guide surface 12 on which it slides are arranged transversely or crosswise in relation to the v-axis around which the moveable articulation section 20 and the mirror plate 1 vibrate. Thus aforementioned connecting element 30 and the guide surface 12 resist the vibrational motion of moveable section of the articulation 20 and mirror plate 1 which is assembled on it around the geometric v-axis, thus eliminating or reducing the amount of vibration.

Within the basic concept described above, the multi-use articulation, the object of the present invention patent, could have many modifications regarding the materials, dimensions and structural details without any deviations from the scope of the requested protection.

Within the scope of the present invention, and for a better manufacturing method than heretofore known, base region 11 of the stationary articulation section 10 is provided with perforations P for the appropriate means of attachment to the wall of the housing 2.

In a preferred embodiment of the invention the base portion 24 of the internal truncated conical portion 22 of the moveable articulation section 20 is provided with a pair of opposing hook-shaped projections 23 provided with respective central openings in which corresponding end portions 31 of the connecting element 30 are comparatively tightly engaged to provide for a greater axial tightening and thus a greater torque that is more suitable for the manual adjustment type mechanism.

In another preferred embodiment illustrated in FIGS. 3a, 3b, 3c and 3d, a second pair of opposite hook-shaped projections 23' are arranged in a perpendicular orientation with respect to the first pair. This second pair of hook-shaped projections define respective central openings in which corresponding end portions 31 of the connecting element 30 engage therein in a looser manner, in order to provide for a lesser axial tightening and thus a lesser torque for adjustment that is more suitable for the cable remote control type mechanism. The base portion 24 of the internal truncated conical portion 22 of the moveable articulation section 20 is provided with perforations 25 to receive the ends of the cables of the remote control mechanism. Otherwise this embodiment is generally the same as the previously described embodiment.

In a further preferred embodiment, the base portion 24 of the internal portion 22 of the moveable articulation section 20 has two opposite hook-shaped projections and the outwardly turned end portions 31 of the connection element 30 are staggered, having thicker sections providing a greater axial tightening, and therefore a greater torque appropriate for assemblies of the manual adjustment type and thinner sections providing a lesser axial tightening, therefore lesser torque which is appropriate for remote control assemblies.

Optionally, instead of the torque adjustment being determined by the hook-shaped projections 23 of the moveable articulation section 20 and/or the end portions 31 of the connection element 30, as described for the above embodiment, the aforementioned torque can be determined by a helical spring S assembled to operate by compression or traction between the central areas of the stationary articulation section 10 and the moveable articulation section 20, thus respectively providing a lesser or greater axial tightening between the stationary articulation section 10 and the moveable articulation section 20 and therefore lesser or greater torque which is adequate for remote control or manually adjusted assemblies respectively.

Figure 4A:
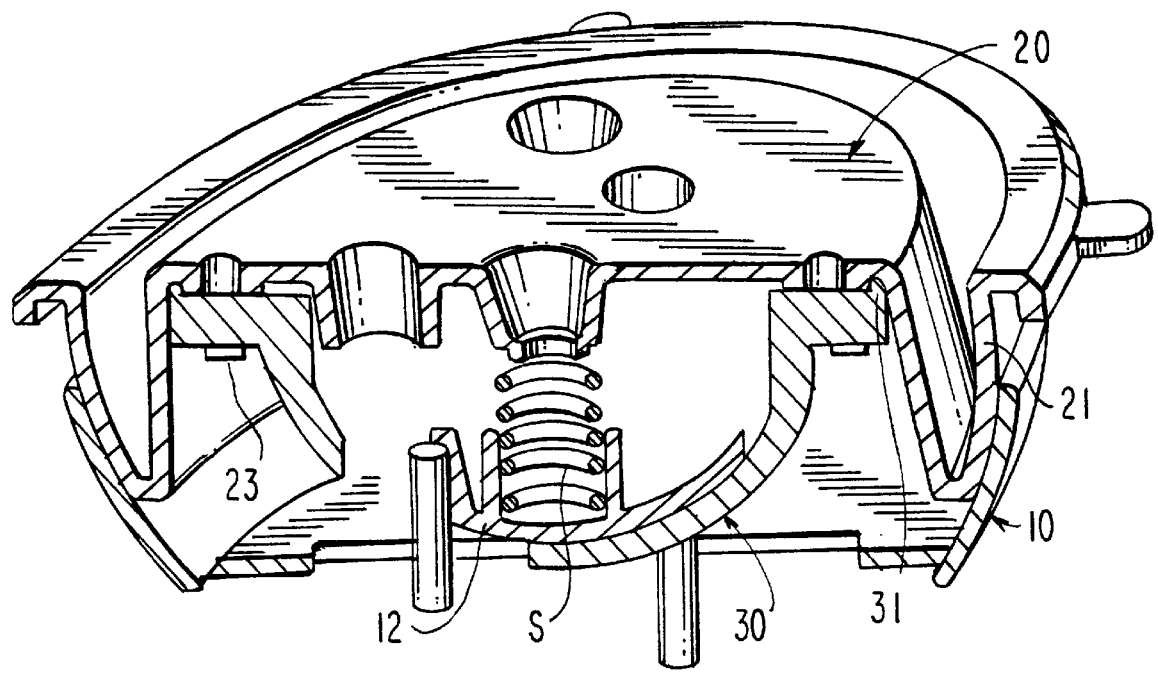
FIGS. 4a to 4b are respectively a cutaway perspective and a cross-sectional action view through an additional embodiment of the multi-use articulation according to the invention.
Figure 4B:
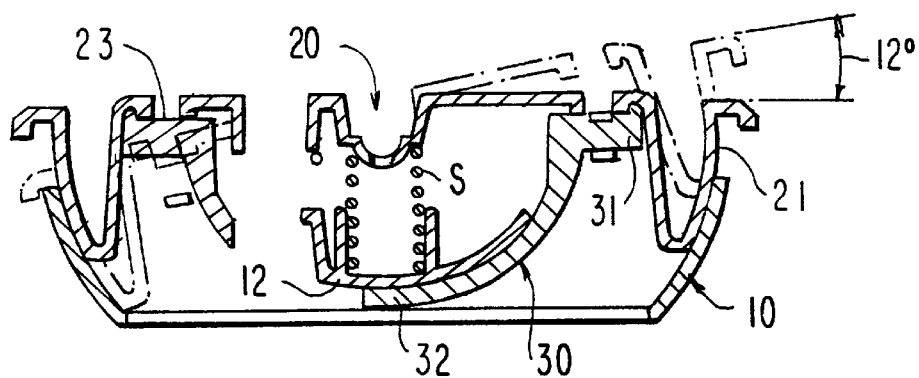

In an additional preferred embodiment shown in FIGS. 4a and 4b, the foregoing spring S can work in conjunction with the hook-shaped projections 23 of the moveable articulation section 20 and/or the end portions 31 of the connecting element 30 to determine the adjustment torque between the stationary articulation section 10 and moveable articulation section 20. FIG. 4b shows an action view in which the moveable articulation section 20 is rotated 12° out of the stationary articulation section 10.

The intermediate arched portion 32 of the connecting element 30 and the guide surface 12 of the stationary articulation section 10, which receives the aforementioned arched portion 32, may have areas that are determined by the type of mirror that the articulation is designed for and the vibration level to which it is subjected around a v-axis perpendicular to the aforesaid connecting element 30 and the surface guide 12, so as to provide an adequate degree of friction to absorb the vibrations.

Other solutions to provide the articulation with a multiple character, manually adjusted or so-called hand-set or remote control, and/or to act as an anti-vibration device can be proposed by the technical experts in this matter, which are claimed to be understood to be within the essential concept of the invention, as, for instance, a distance d between the pair of hook-shaped projections 23 of the moveable articulation section 20, receivers of the end portions 31 of the U-shaped connecting element 30, and the guide surface 12 of the stationary articulation section 10 on which the intermediate arched portion 32 of the aforementioned connecting element 30 moves could remain slightly greater for the manually adjusted type assembly than that distance d' for the cable operated remote control assembly.

The articulation, object of the present invention, is applicable to the field of spare parts, more precisely to automobile accessories.

The invention described above is also described in Brazilian Patent Application PI 97.02665-4 of Jul. 28, 1997. This Brazilian Patent Application provides the basis for a claim of priority for the present invention under 35 U.S.C. 119 and is hereby explicitly incorporated herein by reference.

While the invention has been illustrated and described as embodied in a multi-use articulation for external side view mirrors, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new an is set forth in the following appended claims:

We claim:

1. A multi-use articulation for an external side view mirror, said external side view mirror comprising a mirror plate (1), the multi-use articulation, a housing (2) accommodating the mirror plate and the articulation;

wherein said external side view mirror includes means for manually adjusting a position of the mirror plate (1) or means for adjusting said position of the mirror plate (1) by remote control via a lever and cables connected to the lever;

wherein said multi-use articulation comprises
a stationary articulation section (10) substantially in a shape of a spherical section,
a moveable articulation section (20) which tightly fits and slides in the stationary articulation section (10), and
means for connecting both of the articulation sections, for torque adjustment and for vibration absorption, said means for connection, for torque adjustment and for vibration absorption comprising a U-shaped connecting element (30); and
wherein said stationary articulation section (10) has a smaller base region (11) and is mounted with said smaller base region (11) on a wall of the housing (2), the moveable articulation section (20) has an outer portion (21) of identical shape as the stationary articulation section (10), said outer portion (21) fits tightly and slides within the stationary articulation section, an internal truncated conical portion (22) projects from the movable articulation section (20) concentric with said outer portion (21), a rear surface of the mirror plate (1) resting on the internal truncated conical portion, and, when said external side view mirror includes means for adjusting said position of the mirror plate by remote control, said outer portion (21) is attached to cable ends of the cables for moving the moveable articulation section, the U-shaped connecting element (30) has an intermediate arched portion (32) and outwardly turned end portions (31) connected to a pair of diametrically opposed hook-shaped projections (23) protruding from a base portion (24) of the internal truncated conical portion (22), so that the hook-shaped projections (23) and the end portions (31) provide means for a tighter axial assembly for manual adjustment or for a looser axial assembly suitable for remote control adjustment, said U-shaped connecting element (30) is retained tightly and free to slide on a curved guide surface (12) designed to provide a greater force for motion of the moveable articulation section (20) and consequently the mirror plate (1) around a geometric x-axis extending transversely in relation to the connecting element (30) and consequently in relation to said intermediate arched portion (32) and to provide a smaller force for motion of the moveable articulation section (20) and the mirror plate (1) around a geometric y-axis arranged extending in a direction along the connecting element (30).

2. The multi-use articulation as defined in claim 1, wherein the U-shaped connecting element (30) of the stationary articulation section (10) and moveable articulation section (20) and the guide surface (12) of the stationary articulation section (10) on which the connecting element slides are arranged transversely in relation to a v-axis around which the moveable articulation section (20) and the mirror plate (1) vibrate so as to provide vibration attenuation.

3. The multi-use articulation as defined in claim 2, wherein the base region (11) of the stationary articulation section (10) is provided with perforations (P) to receive means for attaching the stationary articulation section to the wall of the housing (2), the pair of diametrically opposed hook-shaped projections (23) have respective central openings to more tightly receive the corresponding end portions (31) of the connecting element (30) in order to provide a greater axial tightening and therefore greater adjusting torque more suitable for manual adjustment of the position of the mirror plate, and further comprising another pair of diametrically opposed hook-shaped projections (23') arranged in a perpendicular orientation to said pair of diametrically opposed hook-shaped projections (23) that define respective central openings receiving less tightly the corresponding end portions (31) of the connecting element (30) in order to provide less torque for adjustment more suitable for remote control of the position of the mirror plate, and the base portion (24) of the internal truncated conical portion (22) of the moveable articulation section (20) is additionally provided with perforations (25) receiving the cable ends of the cables of a remote control mechanism.

4. The multi-use articulation as defined in claim 3, wherein the diametrically opposed hook-shaped projections (23) and the end portions (31) are staggered and have thicker portions for greater axial tightening and therefore greater torque appropriate for manual adjustment and thinner portions for lesser axial tightening, therefore smaller torque appropriate for an adjustment by remote control.

5. The multi-use articulation as defined in claim 1, further comprising an axial helical spring (S) arranged to operated by compression or traction between central portions of the stationary articulation section (10) and the moveable articulation section (20) in order to provide a lesser or greater adjustment torque suitable for either remote control or manual adjustment.

6. The multi-use articulation as defined in claim 5, wherein the axial helical spring (S) cooperates with the hook-shaped projections (23) of the moveable articulation section (20) and/or the end portions (31) of the connecting element (30) for determination of the adjusting torque between the stationary articulation section (10) and the moveable articulation section (20).

7. The multi-use articulation as defined in claim 2, wherein the intermediate arched portion (32) of the connecting element (30) and the guide surface (12) of the stationary articulation section (10) receiving said intermediate arched portion (32) have areas formed according to whether said mirror plate is to be adjusted manually or by remote control and according to a capacity to vibrate around a v-axis perpendicular to the connecting element (30) and guide surface (12) in order to provide an adequate level of vibration attenuation.

8. The multi-use articulation as defined in claim 3, wherein a distance (d) between said pair of the hook-shaped projections (23) of the moveable articulation section (20) receiving the end portions (31) of the U-shaped connecting element (30) and the guide surface (12) of the stationary articulation section (10) on which the intermediate arched portion (32) moves is slightly greater for manual adjustment than a distance (d') between the guide surface (12) and said another pair of the hook-shaped projections (23') for remote control by a cable assembly.

* * * * *